Patented Mar. 7, 1950

2,499,501

UNITED STATES PATENT OFFICE 2,499,501

CELLULOSE DERIVATIVES

John P. Hollihan, Jr., Garden City, and Sanford A. Moss, Jr., Ridley Park, Pa., assignors to American Viscose Corporation, Wilmington, Del., a corporation of Delaware No Drawing. Application October 5, 1945, Serial No. 620,642

4 Claims. (Cl. 18—54)

This invention relates to cyanoethyl derivatives of cellulose, and to fibers, yarns, and other shaped articles formed therefrom.

As disclosed in our copending application Serial No. 549,290, filed August 12, 1944, now Patent No. 2,492,428 issued December 27, 1949 when acrylonitrile is added to viscose, a portion thereof reacts with the sulfur-containing by-products produced upon hydrolysis of the cellulose xanthate, while the remainder of the acrylonitrile reacts directly with the cellulose xanthate in the dissolved state, with the production of cyanoethylated cellulose. The cyanoethylated cellulose thus produced is in a new form, in which the cyanoethyl groups are uniformly distributed within and through the cellulose phase.

We have discovered that fibers, films, and other shaped articles having valuable properties are obtained by forming the cyanoethylated cellulose into the desired shape, preferably simultaneously with coagulation thereof before hydrolysis of the cyanoethyl groups, or any substantial proportion thereof, is effected. Generally, the cyanoethylated cellulose is extruded into an appropriate setting bath, to form fibers or filaments, or otherwise shaped and coagulated within a period of less than about 25 hours after the acrylonitrile and viscose have been intimately admixed. The salt point of the viscose which, as explained in the copending application referred to above, is raised through a maximum upon the addition of the acrylonitrile thereto, is still approximately at the maximum point at the time of shaping and coagulating the mixture, such shaping and coagulating being carried out before the viscose is returned to its original salt-point, i. e., re-aged, with accompanying hydrolysis of the cyanoethyl groups to carboxyethyl groups.

Due to the generally insolubilizing effect of the nitrile group, the products are, broadly speaking, insensitive to water and insoluble therein. However, if a limited percentage of the cyanoethyl groups are hydrolyzed to amido or carboxyethyl groups, the products may be water-sensitive to some extent, the extent of water-sensitivity being controllable.

When proceeding in accordance with this invention, the proportion of cyanoethyl groups to anhydroglucose units of the cellulose is comparatively low, ranging from about one cyanoethyl group to about 110 anhydroglucose units, to about one cyanoethyl group to seven anhydroglucose units, depending upon the quantity of acrylonitrile mixed with the viscose which may be in the range of from about 1 to 10% and is usually in the range of about 1 to 6% by weight, and preferably is in the range of from about 1 to 5% by weight, to yield a cyanoethylated cellulose in which the proportion of cyanoethyl substituent groups introduced into the cellulose to anhydroglucose units of the cellulose ranges from about 1:110 to about 1:9.

Preferably, the acrylonitrile and viscose are mixed with stirring, at temperatures which are maintained at 40° C. or below, in order to prevent polymerization of the acrylonitrile, and the product is formed to the desired shape, simultaneously with coagulation, within a period of not longer than about 25 hours.

The articles formed from the viscose-acrylonitrile mixture, in which at least the major portion of the cyanoethyl groups introduced into the cellulose and uniformly distributed within and through the cellulose phase are unhydrolyzed, have modified properties as compared with articles formed from viscose per se, chiefly by reason of the fact that the cyanoethyl groups exert a so-called animalizing effect on the cellulose. Fibers and other articles formed from the new cyanoethylated cellulose are capable of being dyed with acid dyestuffs, in contrast to articles formed from viscose which has not been cyanoethylated and which exhibit an extremely poor affinity for acid dyestuffs under ordinary dyeing conditions. Further, in some cases at least, the articles have substantially reduced moisture retaining capacity with resultant improved dimensional stability. Articles formed from the cellulose which has been cyanoethylated in accordance with the invention do not shrink upon drying, and show the same extended structure after drying as do the articles leaving the setting bath or coagulating medium.

The following table will illustrate the results obtained by adding varying amounts of acrylonitrile to a viscose obtained from 50% wood pulp and 50% cotton pulp, and analyzing from about 1.9 to about 2.5% total sulfur, from about 6 to 9% sodium hydroxide (based on percent weight in viscose), from about 6 to 9% by weight cellulose, and having a normal salt point (about 4.5 to 5.0), and spinning the viscose, within a period less than 25 hours after the acrylonitrile addition, and at a salt point in the neighborhood of about 13, into an aqueous spinning bath containing 11% sulfuric acid, 20% sodium sulfate, and about 5% zinc sulfate.

| Acrylonitrile Added | Per Cent Cyanoethyl | Average No. of Glucose Units per Cyanoethyl Group | Denier | Tensiles g./den. | | Extensibility | |
|---|---|---|---|---|---|---|---|
| | | | | Dry | Wet | Dry | West |
| Per Cent 2 | 0.61 | 45 | 307 | 2.47 | 1.42 | 23.1 | 34.6 |
| 4 | 1.72 | 16 | 305 | 1.84 | 0.85 | 32.0 | 50.0 |

The constitution of both the viscose and the spinning bath may vary. Preferably, the spinning bath contains from about 11 to 12.5% sulfuric acid, from about 20 to 25% sodium sulfate, and a relatively high proportion of zinc sulfate. Instead of using zinc sulfate in the bath, it may be replaced by or used in combination with other inorganic salts of metals, preferably other metallic sulfates having a minimum solubility of 5% in sulfuric acid solutions of from 6 to 15% concentration as, for instance, the sulfates of iron, magnesium, chromium, cadmium, manganese, nickel, or aluminum, preferably in a proportion of 5% or more.

Variations may be made, of course, in the specific conditions described above by way of exemplification, without departing from the spirit and scope of the appended claims.

This application is a continuation-in-part of our pending application Serial No. 549,290, filed August 12, 1944.

We claim:

1. The method of making shaped articles comprising cyanoethyl cellulose which comprises mixing acrylonitrile with viscose at a temperature of about 40° C. to effect reaction between the acrylonitrile and dissolved cellulose xanthate whereby cellulose xanthate groups are converted to cyanoethyl groups with the production of a cyanoethyl cellulose xanthate in which the cyanoethyl groups are distributed substantially uniformly along each of the molecular chains at all portions of the cellulose xanthate, and then, before any appreciable hydrolysis of the cyanoethyl groups is effected, shaping the reaction mass to predetermined shape while treating it with an acid coagulating and cellulose-regenerating medium which converts unreacted xanthate groups to hydroxyl groups.

2. The method of making artificial filaments comprising cyanoethyl cellulose which comprises mixing viscose with from 1 to 10% by weight of acrylonitrile, based on the weight of the viscose, at a temperature of about 40° C., to effect reaction between the acrylonitrile and dissolved cellulose xanthate whereby cellulose xanthate groups are converted to cyanoethyl groups with the production of a cyanoethyl cellulose xanthate in which the cyanoethyl groups are distributed substantially uniformly along each of the molecular chains at all portions of the cellulose xanthate, and then, before any appreciable hydrolysis of the cyanoethyl groups is effected, extruding the reaction mass as filament-forming streams into an aqueous acid coagulating and cellulose-regenerating medium which converts unreacted xanthate groups to hydroxyl groups.

3. A method as in claim 2, wherein the reaction mass is extruded into the aqueous coagulating and cellulose-regenerating medium which converts unreacted xanthate groups to hydroxyl groups, within a period less than 25 hours after mixing of the acrylonitrile and viscose.

4. A method as in claim 2, wherein the coagulating and cellulose-regenerating medium comprises an aqueous solution of 11% sulfuric acid 20% sodium sulfate, and 5% of zinc sulfate.

JOHN P. HOLLIHAN, Jr.
SANFORD A. MOSS, Jr.

REFERENCES CITED

The following references are of record in the file of this patent:

UNITED STATES PATENTS

| Number | Name | Date |
|---|---|---|
| 1,188,376 | Lilienfeld | June 20, 1916 |
| 2,114,915 | Davis | Apr. 19, 1935 |
| 2,201,663 | Ellsworth et al. | May 21, 1940 |
| 2,265,918 | Lilienfeld | Dec. 9, 1941 |
| 2,302,077 | Von Kohorn | Nov. 17, 1942 |
| 2,332,049 | Bock | Oct. 19, 1943 |
| 2,375,847 | Howtz | May 15, 1945 |
| 2,390,032 | Stallings | Nov. 27, 1945 |

OTHER REFERENCES

Ser. No. 280,527, Campolunghi (A. P. C.), published April 27, 1943.